Aug. 15, 1961 J. M. SLATER ET AL 2,995,937
FLOTATION GYROSCOPE

Filed Nov. 30, 1951 3 Sheets-Sheet 1

INVENTORS
JOHN M. SLATER
GERALD S. PERKINS
JOSEPH C. CROWLEY
MURYL HALLMAN
ROBERT M. BENSON
BY DOMINIC J. SANTOGROSSI

William R. Lane
ATTORNEY

INVENTORS
JOHN M. SLATER
GERALD S. PERKINS
JOSEPH C. CROWLEY
MURYL HALLMAN
ROBERT M. BENSON
BY   DOMINIC J. SANTOGROSSI

*William R. Lane*
ATTORNEY

Aug. 15, 1961  J. M. SLATER ET AL  2,995,937
FLOTATION GYROSCOPE

Filed Nov. 30, 1951  3 Sheets—Sheet 3

INVENTORS
JOHN M. SLATER
GERALD S. PERKINS
JOSEPH C. CROWLEY
MURYL HALLMAN
ROBERT M. BENSON
BY DOMINIC J. SANTOGROSSI

William P. Lane
ATTORNEY

United States Patent Office 2,995,937
Patented Aug. 15, 1961

2,995,937
FLOTATION GYROSCOPE

John M. Slater, Inglewood, Gerald S. Perkins, Altadena, Joseph C. Crowley, Long Beach, Muryl Hallman, Whittier, Robert M. Benson, Downey, and Dominic J. Santogrossi, Los Angeles, Calif., assignors to North American Aviation, Inc.
Filed Nov. 30, 1951, Ser. No. 259,192
2 Claims. (Cl. 74—5)

This invention relates to gyroscopes, and particularly to an improved gyroscope having improved means for virtually frictionless support thereof about its precession axis.

In the design of gyroscopes for use in connection with the guidance of high speed aircraft and guided missiles it is necessary to provide a precession axis support which is as nearly free of disturbing torques as possible. One method of providing this support is shown and described in patent application Serial No. 121,964 filed October 18, 1949 and now Patent No. 2,644,727 in the name of Vernon A. Tauscher et al., for "Double-Ball Gyro Precession Axis Bearing," wherein the gyroscope is supported about its precession axis by a pneumatic bearing. While the pneumatic bearing provides a support which permits very much greater accuracy in the gyroscope than is achievable by conventional ball or roller bearings, the pneumatic bearing has a number of disadvantages which stem from the necessity for a clean air supply to the bearing. If the operational conditions of a gyroscope include high altitude use, the supplying of air under pressure to a pneumatic bearing may become a problem which may be solved only by the addition of a weight penalty in the form of pumps, compressors, and filters, or a pressurized bottle air supply.

This invention contemplates the support of a gyroscope in a fluid medium having the same virtual density as the gyroscope. When the gyroscope is thus supported, the problem of precessional axis constraint becomes of much less significance than in the case of the air bearing, because now the precession axis bearing needs to support only a small fraction of the weight of the gyroscope. Floated gyroscopes have been proposed in the past, but such proposals encountered seemingly insurmountable obstacles in that the materials most desirable and suitable for the construction of a gyroscope—such, for example, as Invar or steel—could not be fabricated into a gyroscope having optimum mechanical properties while still having an average density equal to that of any acceptable flotation medium. For example, the density of Invar and steel may range from 8½ to 9 with the optimum gyro constructed thereof having a density of approximately 6. However, there exists no practical fluid for floating a device having a density of 6 which has that same density. The dense fluids most suitable for flotation of a gyroscope could be used only with gyroscopes made of metals such as aluminum, which are considered undesirable for a gyroscope by reason of the physical properties thereof.

This invention contemplates the combination of a gyroscope constructed generally in accordance with principles disclosed in patent application Serial No. 72,524, filed January 24, 1949 and now Patent No. 2,649,808 in the name of John M. Slater et al., for "Gyroscope," but made principally of titanium, the density of which is approximately 4.5. The average density of an optimum gyroscope constructed of titanium is approximately 2.8. By optimum gyroscope is meant a gyroscope having the characteristics disclosed in the above patent application. This density is low enough to make practical the use of tetrabromoethane as the flotation medium. Besides being admirably suited to the purposes because of its density, titanium is found to have very high corrosion resistance to tetrabromoethane, a property of which is that it tends to decompose with the formation of hydrobromic acid. By the use of a flotation medium rather than a pneumatic bearing, problems of air supply are eliminated and a completely closed and hermetically sealed gyroscope may be attained.

Gyroscopes have been proposed for use as inertial references for the automatic navigation of an aircraft. If a sufficiently precise gyroscope torquer-pickoff combination could be achieved it would be possible to maintain an inertial reference for an autonavigator, which reference would be kept locally vertical throughout the flight of the aircraft or missile navigated. In order to keep the reference always locally vertical it is necessary that the gyroscope be torqued very accurately so that it will precess with an effective drift rate of the order of $10^{-4}$ to $10^{-5}$ of the sum of the diurnal angular velocity of the earth and the angular velocity of the aircraft or missile about the center of the earth. Such accuracy may be obtained from a gyroscope of the type disclosed in patent application Serial No. 72,524, filed January 24, 1949 in the name of John M. Slater et al., for "Gyroscope," provided that it is kept orthogonal to the direction of the earth's gravitation, which means that the torquer used with the gyroscope must be capable of supplying a torque proportional to the current supplied to it within $10^{-4}$ or $10^{-5}$.

It is therefore an object of this invention to provide a pickoff gyroscope torquer combination sufficiently accurate to be useful in the autonavigation of a missile or aircraft.

It is another object of this invention to provide an improved gyroscope.

It is another object of this invention to provide in combination a gyroscope of optimum design and means for floating the gyroscope in a medium having the same average density as a gyroscope.

It is another object of this invention to provide improved means for supporting a gyroscope about its precessional axis.

It is another object of this invention to provide a gyroscope which is insensitive to high variable accelerations such as those present in aircraft and guided missiles.

It is another object of this invention to provide a gyroscope of improved precision.

Other objects of invention will become apparent from the following description taken in connection with the accompanying drawings, in which.

Figure 1:
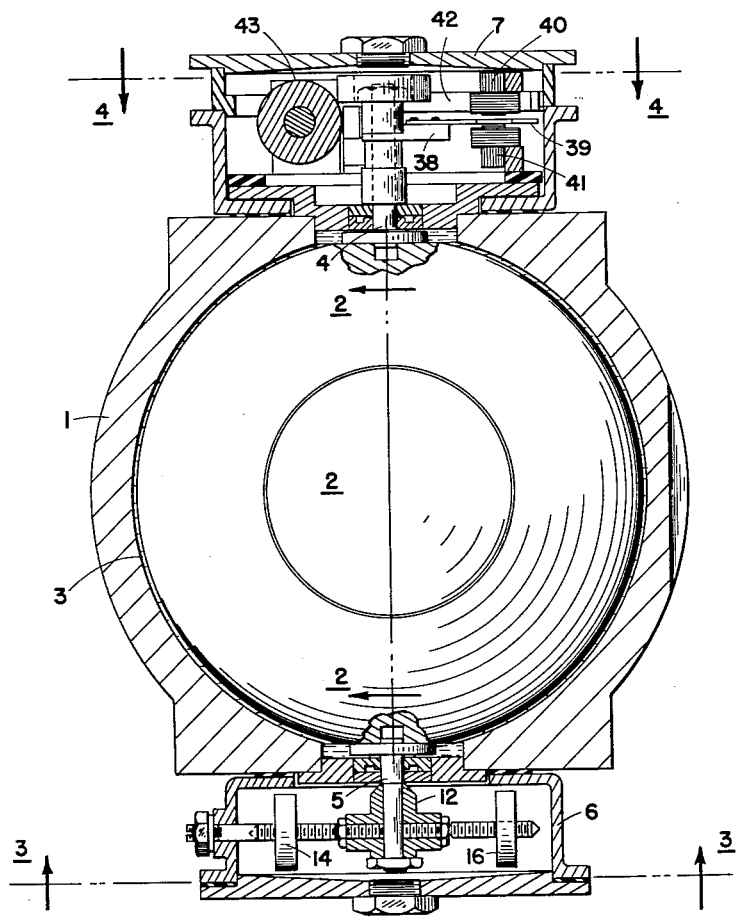
FIG. 1 is an elevational view of the invention partly in section.
Figure 6:
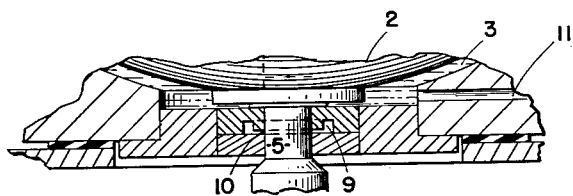
FIG. 6 is a fragmentary sectional view of the device taken at 6—6 in FIG. 3.
Figure 7:
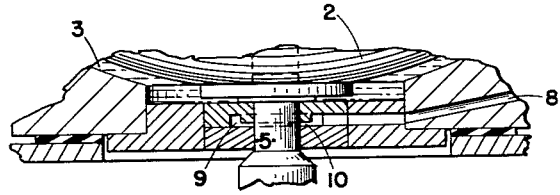
FIG. 7 is a fragmentary sectional view of the device taken at 7—7 in FIG. 3.
Figure 3:
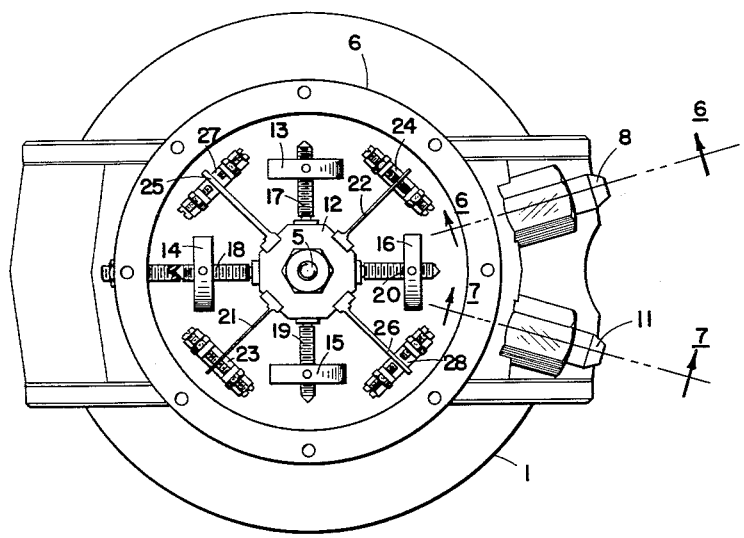
FIG. 3 is a sectional view of the invention taken at 3—3 in FIG. 1.

Referring now to the drawings, and particularly to FIG. 1, there is shown a fluid-tight housing 1 having a spherical interior surface enclosing a spherical gyro case 2 and containing a flotation fluid 3 between said housing and said casing. Attached to the end of said casing are stub shafts 4 and 5 extending into sealed end housings 6 and 7. The interior of end housings 6 and 7 communicates with the interior of housing 1, and said housings are likewise filled with flotation fluid 3. Flotation fluid 3 may consist of tetrabromoethane or some other relatively nontoxic and noncorrosive dense fluid. Stub shafts 4 and 5 rotate with respect to housing 1 upon fluid dynamic bearings shown typically in detail in FIGS. 6 and 7. In FIG. 7, flotation fluid 3 under pressure is supplied through port 8 to annular chamber 9 which communicates by annular passage 10 to shaft 5. The fluid passes along shaft 5 to outlet conduit 11, hence it flows through the interior of housing 1 to an outlet or fluid return port (not shown). Attached to the end of stub shaft 5 is an octagonal fitting 12 shown in FIGS. 1 and 3 to which is attached counterweights 13, 14, 15, and 16 by means of threaded bolts 17, 18, 19, and 20. Also attached to fitting 12 are flexible leaf springs 21 and 22 which extend in cantilever fashion to engagement with adjustable stops 23 and 24. Also attached to fitting 12 are cantilever members 25 and 26 of thicker cross-section than springs 21 and 22. Cantilever members 25 and 26 are limited in movement by adjustable stops 27 and 28.

Figure 2:
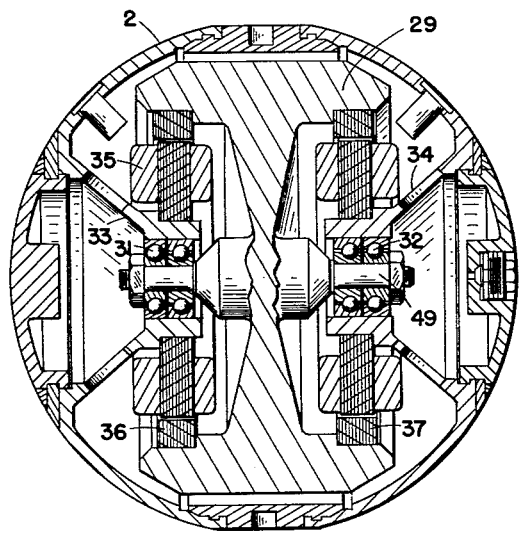
FIG. 2 is a sectional view of the device shown in FIG. 1 taken at 2—2 in FIG. 1.

Referring now to FIG. 2, the internal construction of the gyroscope is shown in detail. The gyroscope consists of a rotor 29 of iso-elastic design similar to that shown and described in patent application Serial No. 72,524, filed January 24, 1949 in the name of John M. Slater et al., for "Gyroscope." Rotor 29 is supported in preloaded ball bearings 31 and 32 of the type shown and described in the above patent application. Bearings 31 and 32 are supported in conical end bells 33 and 34 attached to spherical gyro case 2. End bells 33 and 34 also are attached to stator 35 of the gyroscope motor which furnishes torque in cooperation with saturable annuli 36 and 37 attached to the rotor of the gyroscope. End bells 33 and 34 are very rigidly attached to casing 2 and to the outer races of bearings 31 and 32, and since bearings 31 and 32 are of the preloaded type, the shaft 49 of rotor 29 in cooperation with end bells 33 and 34 acts as an integral reinforcing strut for casing 2.

Figure 4:
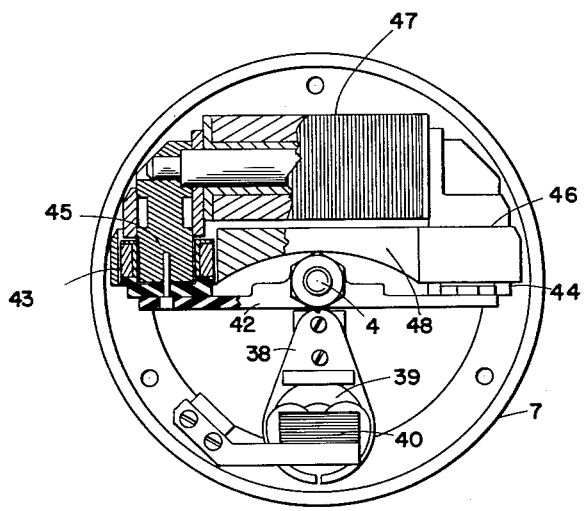
FIG. 4 is a sectional view of the device shown in FIG. 1 taken at 4—4 in FIG. 1.
Figure 5:
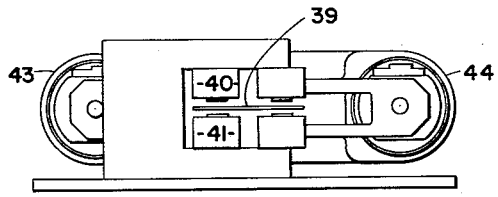
FIG. 5 is an elevational view of the device shown in FIG. 4.

Referring now to FIGS. 1, 4, and 5, there is shown the pickoff and torquer assembly, the purposes of which are to detect and create precession of the gyroscope. Attached to shaft 4, as shown in FIG. 1, is pickoff arm 38 to which is integrally attached pancake coil 39, a spirally-wound, flat copper wire coil. Coil 39 is situated midway vertically in FIG. 1 between the ends of two laminated C shaped permeable iron cores 40 and 41 upon which are wound many turns of current-carrying wire. Torquer arm 42 is also attached to shaft 4 and carries on its ends electromagnetic coils 43 and 44 which interact with permeable iron pole pieces 45 and 46 magnetically associated with winding 47.

In operation, alternating current at a frequency of the order of 400 cycles per second, or more, is applied to the coils wound on C shaped members 40 and 41 which are wound so that when coil 39 is exactly centered between the arms of the C shaped members no signal is generated in coil 39. When coil 39 is not centered, however, as would be the case when the gyroscope were slightly rotated about its precessional axis, a voltage is generated in coil 39, which voltage is proportional to the amount of such displacement. The voltage so produced is proportional to the displacement over a considerable range and with very great accuracy, because any deformation of the magnetic field produced by the flow of current through the moving coil in one direction at one arm of the C shaped members is exactly offset by a similar deformation of opposite effect in the other arm of the C shaped members.

Turning to the torquer, one of the desirable features of the torquer is that it produces a torque which is linearly related to a specified electrical signal. In the case of the torquers shown in FIGS. 1, 4, and 5, a constant direct current is applied to coil 47, and a direct current proportional to the torque desired to be imparted to the gyroscope is applied to coils 43 and 44 upon the movable element of the torquer. The path of the flux due to current flowing in coil 47 is through the core of the coil through ferromagnetic members 45 and 46 and through yoke 48. The direct current to which the torque is to be made proportional is applied to coils 43 and 44; and one of these coils is wound in the direction such that the flux created thereby opposes the flux created by coil 47, while the other is wound to aid the flux created by coil 47. The result is that a couple is produced about the precessional axis of the gyroscope, which couple is the desired torque. The force produced by such an arrangement may be conveniently represented by the equation:

$$F = Bli$$

where $B$ is the flux density, $l$ is the length of turns, and $i$ is the current flowing in them. Since the current supplied to coils 43 and 44 also effects the flux density, it might be anticipated that a nonlinear force current relation would hold. However, since in one of the coils the flux produced by current in the coil reinforces the flux produced by coil 47, and in the other coil the current tends to buck the flux produced by coil 47 while the force in each coil is nonlinearly related to the current, the torque produced by the combination of the forces from each coil is proportional to the current fed to the coils. The movable coils, of course, are placed in series and are both fed with the signal to which the torque is desired to be made proportional.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Direction sensitive means comprising a gyroscope of single degree of freedom including a stator, a rotor, and means for rotating said rotor; a hollow sphere enclosing said rotor; a pair of conical members coaxial with the rotor, each attached at the larger end thereof to said sphere and at the smaller end to said stator at the ends of said rotor; a housing having a spherical inner contour concentric with and closely surrounding said sphere, a fluid contained in said housing having a density substantially equal to the effective density of said gyroscope and said sphere; a pair of stub shafts attached to said sphere along a diameter thereof at right angles to the rotor spin axis so as to define a precession axis of said gyroscope; and liquid bearing means on said housing for supporting said shafts for virtually frictionless freedom for rotation about said precession axes, assembly of stator, rotor and sphere constituting a figure of revolution about both spin and precession axes.

2. A gyroscope comprising a rotor, a motor stator for driving the rotor, spin bearings for supporting the rotor, a gimbal member of substantially spherical exterior contour, formed as a figure of revolution with frusto-conical projections having their bases fixed to the outer spherical part and their small ends inward, said stator and spin bearings being symmetrically mounted on the conical projections so that the gimbal member and inner assembly is substantially symmetrical about the spin axis, hydrodynamic bearing members disposed at opposite ends of a diameter of the gimbal member at right angles to the spin axis, so that the gimbal member is symmetrical about the precession axis defined by the bearing members, a case having a spherical inner contour concentric with and closely spaced from the gimbal member and arranged to confine flotation liquid in the spherical gap between the case and the gimbal member, cooperating hydrodynamic bearing members in the case surrounding the gimbal bearing members, and means for introducing liquid under pressure into the gap between the two gimbal bearing members for hydrodynamic support.

References Cited in the file of this patent
UNITED STATES PATENTS 1,501,886    Abbot    July 15, 1924

(Other references on following page)

UNITED STATES PATENTS

| | | |
|---|---|---|
| 1,845,592 | Fieux | Feb. 16, 1932 |
| 1,930,082 | Boykow | Oct. 10, 1933 |
| 2,020,165 | Straatman | Nov. 5, 1935 |
| 2,133,809 | Carter et al. | Oct. 18, 1938 |
| 2,208,207 | Boykow | July 16, 1940 |
| 2,244,603 | Bauer | June 3, 1941 |
| 2,427,130 | Ford | Sept. 9, 1947 |
| 2,547,968 | Paulus | Apr. 10, 1951 |
| 2,567,682 | Silberstein | Sept. 11, 1951 |
| 2,584,125 | Haglund | Feb. 5, 1952 |
| 2,592,582 | Lundberg et al. | Apr. 15, 1952 |